Aug. 25, 1953     W. J. STURTZ     2,649,709
FUEL MILEAGE INDICATOR
Filed Jan. 30, 1948     3 Sheets-Sheet 1
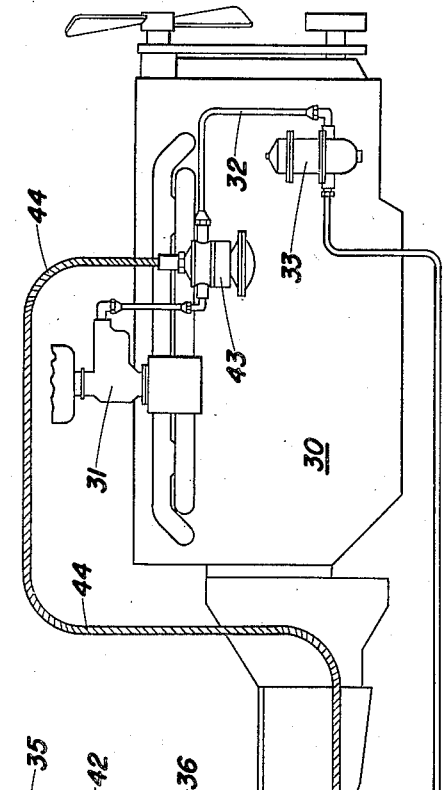
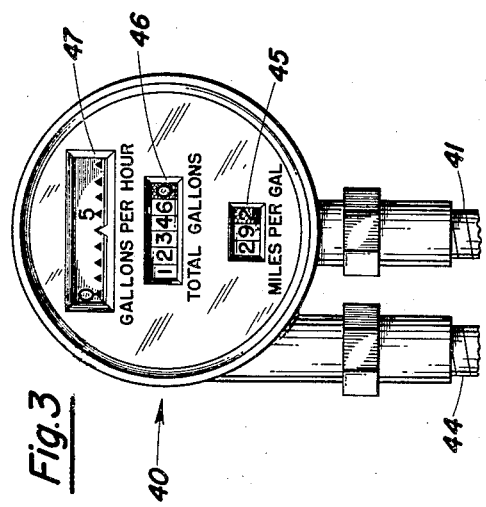
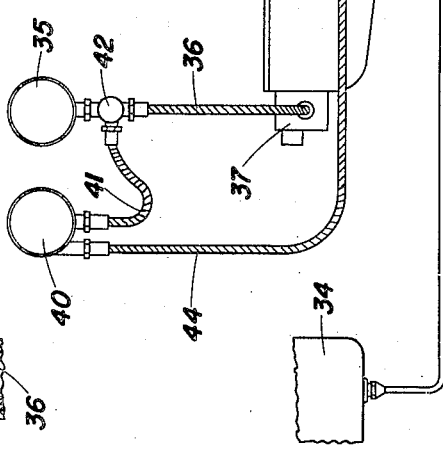
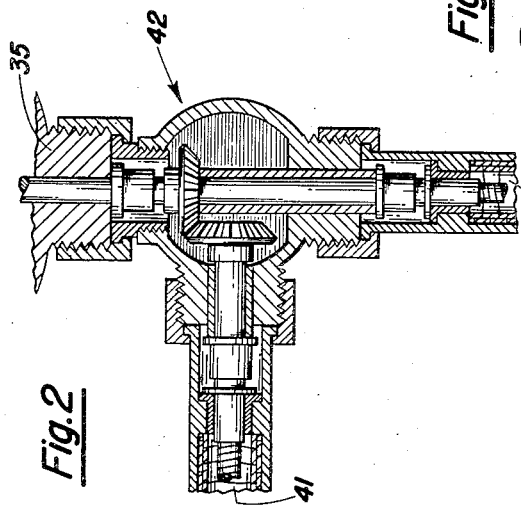
INVENTOR.
William J. Sturtz
BY
M. O. Hayes
Attorney Aug. 25, 1953 W. J. STURTZ 2,649,709
FUEL MILEAGE INDICATOR
Filed Jan. 30, 1948 3 Sheets-Sheet 2
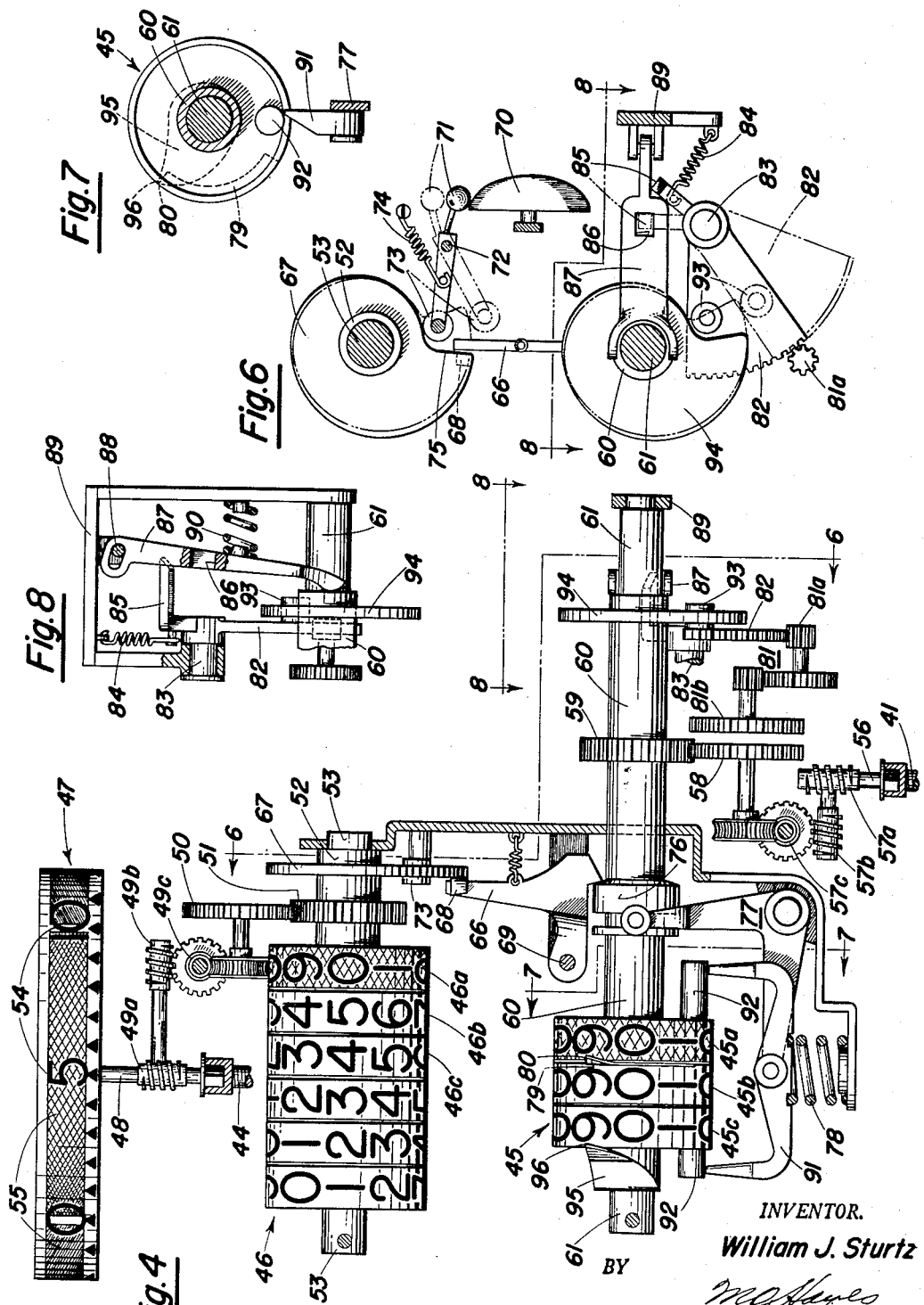
INVENTOR.
William J. Sturtz
BY
*M. O. Hayes*
Attorney Aug. 25, 1953  W. J. STURTZ  2,649,709
FUEL MILEAGE INDICATOR
Filed Jan. 30, 1948  3 Sheets-Sheet 3
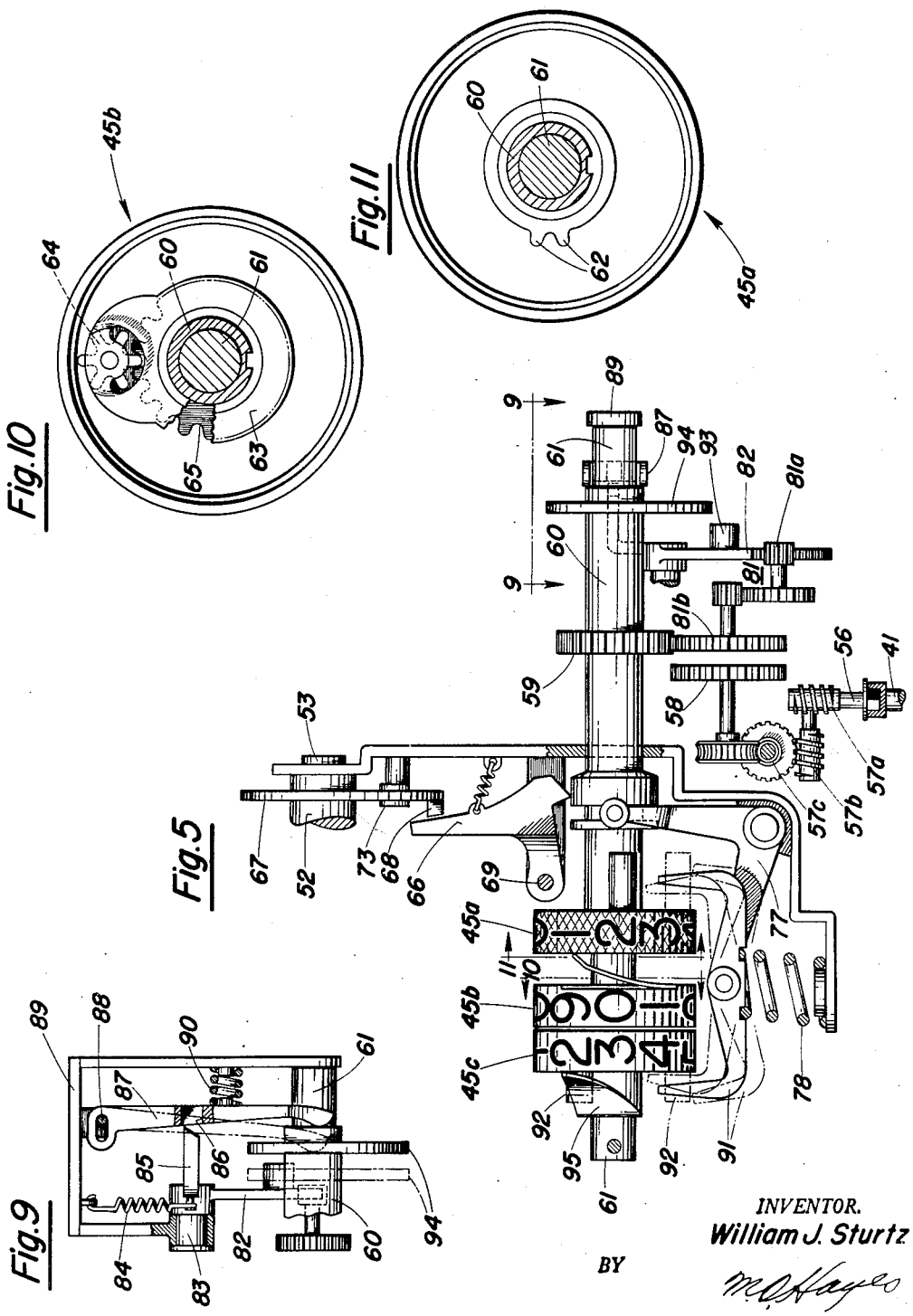
INVENTOR.
William J. Sturtz
BY
M. O. Hayes
Attorney Patented Aug. 25, 1953

2,649,709

UNITED STATES PATENT OFFICE 2,649,709

FUEL MILEAGE INDICATOR

William J. Sturtz, Los Angeles, Calif.

Application January 30, 1948, Serial No. 5,475

5 Claims. (Cl. 73—114)

(Granted under Title 35, U. S. Code (1952), sec. 266)

This invention relates to fuel mileage indicators for use on automobiles and the like.

Among the objects of this invention are: to indicate to the driver the number of miles per gallon currently being secured; cumulatively to record the amount of fuel which has been consumed; and to indicate the rate of fuel consumption at any given moment. By these indicators and records the driver is enabled—especially in conjunction with the usual speedometer and odometer—to determine the fuel consumption either per mile or per hour, and to determine the economy of fuel consumption under varying conditions, such as at various speeds, with various gasolines, with various oils, etc.

A more specific object of this invention is to provide a mileage indicator somewhat akin to the trip mileage indicator on the usual speedometer, which will show the mileage being secured during the consumption of a current gallon of gasoline, and which, at the end of every gallon, will be automatically reset to zero, thereupon to start recording mileage secured on the succeeding gallon.

Still another object of this invention is the provision of a fuel meter which will deliver a continuous rotation to a shaft at a speed in proportion to the current rate at which gasoline flows through the meter, whereby to operate a gallonage-per-hour indicator of structural design similar to that employed for the miles-per-hour indicator of a speedometer.

The foregoing, together with further objects, features, and advantages of this invention are set forth in the following description of a specific embodiment thereof, wherein:

Fig. 1 is a diagrammatical side elevation of the engine, transmission and gasoline tank of an automobile showing the meter and attendant devices of the invention incorporated therein;

Fig. 2 is a cross-section of the power take-off from the main speedometer shaft;

Fig. 3 is a face view of the gasoline consumption meter of Fig. 1;

Fig. 4 is an elevation, somewhat diagrammatical in character, of the mechanism behind the face of the meter of Fig. 3, with housings, bearings, and supporting structure for the most part omitted, and with the parts in their normal position;

Fig. 5 is a view similar to Fig. 4 with the parts in automatic reset position;

Fig. 6 is a transverse vertical section taken on the line 6—6 of Fig. 4, but omitting the counter and shifting mechanism from the background;

Fig. 7 is a detail vertical cross-section taken on the line 7—7 of Fig. 4;

Fig. 8 is a plan view partially broken into section, as seen from the lines 8—8 of Figs. 4 and 6;

Fig. 9 is a view similar to Fig. 8, but showing the parts in the position of Fig. 5;

Fig. 10 is a vertical cross-section on enlarged scale, taken on the line 10—10 of Fig. 5;

Fig. 11 is a view similar to Fig. 10, but looking in the other direction, along the line 11—11;

In Fig. 1 there is shown an internal combustion engine 30 with a carburetor 31 to which gasoline is fed through a tube 32 by a fuel pump 33, which sucks gasoline from the tank 34. The usual instrument board speedometer 35 is driven by a flexible shaft 36 taking its power in the usual manner from the drive shaft of the transmission 37. So much is usual in automobiles.

What has been added thereto to carry out this invention in its preferred form consists in general of a fuel consumption indicator 40 (which has the superficial appearance of another speedometer), a flexible shaft 41 driven by the speedometer shaft 36 through a power take-off 42, a fuel meter 43 which is interposed in the line 32 between the fuel pump and carburetor, and a flexible shaft 44 driven by the fuel meter and connecting with the fuel consumption indicator 40.

As shown in its face view (Fig. 3), the fuel consumption indicator has a register, a gasoline mileage counter 45 which in some respects is like the trip mileage counter in a speedometer. Whenever the carburetor starts consuming a new gallon of gasoline, the gasoline mileage counter 45 is automatically reset to zero. The gasoline mileage counter 45 is driven by the shaft 41, which in turn is driven by the speedometer shaft 36, constituting in effect a branch thereof.

In order that the gasoline mileage counter 45 be reset at every gallon of fuel consumed, there is provided the fuel meter 43 which, through the flexible shaft 44, determines when the gasoline mileage counter 45 is to be reset to zero.

At any given moment the gasoline mileage counter 45 will shown how many miles have been driven on the then current gallon, but that gallon may be only partially consumed. Thus, the gasoline mileage counter 45 indicates the mileage per gallon only immediately before it is reset to zero, when the current gallon has been used up. For this reason the driver is notified—by a bell, for example—just before the current gallon is finally consumed so that he can have an opportunity to read the gasoline mileage counter 45 just before it is automatically reset to zero with the start of a new gallon.

The invention also preferably includes in the indicator 40 a gallonage accumulator or register 46. This corresponds to the odometer register, as distinguished from the trip register, of an ordinary speedometer. The gallonage accumulator 46 is desirable for a number of reasons. It is a permanent, up-to-date record of how much fuel the automobile has consumed during its life. By appropriate readings it may be used to determine the gasoline consumption per month or year, or for a given trip. The reading on the gallonage accumulator 46 may at any time be divided by the odometer reading on the speedometer to give the total average mileage per gallon. The gallonage accumulator may also be used for determining the mileage for an incompletely consumed current gallon of gasoline. For example, if the gasoline mileage counter 45 read eight miles and the tenths wheel of the gallonage accumulator 46 read five, then the driver would know that the half gallon of fuel consumed yielded eight miles, representing a gasoline consumption of sixteen miles per gallon.

The fuel consumption indicator 40 may also include a gallonage-per-hour indicator 47, which would have the superficial appearance of the miles-per-hour indicator of the speedometer. This would indicate the rate of flow of gasoline to the carburetor. This gallonage-per-hour indicator (which does not necessarily have to be graduated in terms of gallons per hour) can be used in connection with the miles-per-hour indicator of the speedometer to determine the relative mileage per gallon for different rates of speed and the most economical speed at which to drive.

In order to drive the gallonage-per-hour indicator 47, it is necessary that the fuel meter 43 be more than a mere volumetric meter registering by increments. Instead it should be more in the nature of a flow meter which will produce a continuous rotation of the shaft 44, whereby to drive the gallonage-per-hour indicator in much the same manner that the continuous rotation of the speedometer shaft drives its miles-per-hour indicator. Therefore, a fuel meter 43 has been devised which, when there is any flow of gasoline, gives a continuous rotational drive to the flexible shaft 44.

The gallonage accumulator 46 and its drive will now be described. In the detailed figures the housing and most of the supporting structure and bearings for the parts have been omitted for clarity. It will be understood that in general those omitted parts can follow the corresponding construction customarily used in speedometers, and much of the mechanism can be speedometer parts.

Referring to Fig. 4, the fuel flow flexible shaft 44 drives the vertical shaft 48 to the end of which it is coupled. Through pairs of worms and gears 49a, 49b and 49c, the shaft 48 drives a drive gear 50 for the gallonage accumulator 46. The gear 50 in turn drives the sleeve gear 51, which is fixed on the sleeve 52 of the tenths wheel 46a of the gallonage accumulator. The sleeve 52, as well as the units wheel 46b and the tens wheel 46c of the gallonage accumulator, is journaled on a fixed shaft 53. The usual planetary gearing, or Geneva movement, is operatively interposed between adjoining register wheels 46a, 46b, etc., of the gallonage accumulator 46, whereby at the completion of each revolution of a given wheel, the left adjoining wheel is rotated one-tenth of a revolution.

The gallonage-per-hour indicator 47 may be driven by a magnet at the upper end of the vertical shaft 48 in the same way that the miles-per-hour indicator is driven in the speedometer. The indicator 47 may carry indicia 54 reading in gallons per hour, or it may carry arcuately spaced colored bands 55 for indicating different ranges of fuel flow, or both.

The gasoline mileage counter 45 and the drive therefor shall next be described. Still referring to Fig. 4, the take-off shaft 41 from the speedometer is coupled at its end to a shaft 56. Through pairs of worms and gears 57a, 57b and 57c the shaft 56 drives the mileage counter drive gear 58. The gear 58 in turn drives a sleeve gear 59 carried by the tenths sleeve 60 of the counter 45, which sleeve 60 is both slidably and rotatably journaled on the fixed shaft 61.

The tenths wheel 45a is fixed on the tenths sleeve 60. The units wheel 45b and the tens wheel 45c are journaled on the fixed shaft 61. Neighboring wheels 45a, 45b, and 45c are interconnected by the usual planetary gear drive shown in Figs. 10 and 11. For example, the left end of the hub of the tenths wheel 45a carries a single pair of teeth 62. An annular pinion support 63 surrounds the shaft 61 and is interposed between the wheel 45a and the wheel 45b. It journals a pinion 64. As the wheel 45a completes one revolution, one of the teeth of the pinion 64 is engaged between the teeth 62 on the wheel 45a and gives a limited turn. The pinion 64 is in continuous engagement with a gear 65 carried by the wheel 45b. The gear ratios of the pinion 64, teeth 62, and gear 65 are such that upon completion of one revolution of the wheel 45a, the adjoining wheel 45b is given one-tenth of a revolution. A similar planetary gear mechanism is interposed between the units wheel 45b and the tens wheel 45c.

It will be understood that the drive mechanism is so arranged that each time a gallon of fuel passes through the meter 43 on the way to the carburetor 31, the tenths wheel 46a of the gallonage accumulator 46 will have completed one revolution. It will be further manifest that every time the automobile has traveled another mile, the tenths wheel 45a of the gasoline mileage counter 45 will complete a revolution.

There will now be explained the manner in which the gasoline mileage counter 45 is automatically reset to zero whenever each integral gallon of fuel has passed through the meter 43. The automatic resetting is controlled by a latch 66. (See Fig. 4.) The latch is released by a latch release cam wheel 67, which is fixed on the tenths wheel sleeve 52 of the gallonage accumulator 46. When the tenths wheel 46a has almost completed a revolution— that is, when it reads about nine and one-half—the upper end of the latch 66 rides up onto a short inclined cam 68 carried by the cam wheel 67. When the tenths wheel 46a reaches its zero position, the latch 66 will have been swung counterclockwise (Fig. 4) about its fixed pivot 69 sufficiently to accomplish the unlatching, the nature of which will be presently described. The automobile driver is given an indication of the imminence of the completion of the consumption of the current gallon and of the imminence of the resetting of the gasoline mileage counter 45, by the sounding of a bell 70 (Fig. 6). The bell hammer 71, which is pivoted on a fixed pivot 72, carries at its opposite end a roller 73 which rides along the periphery of the latch release cam wheel 67. The peripheral profile of the cam wheel 67, against which the roller rides, describes a single spiral, so that the cocking of the bell hammer and its actuating spring 74 offers minimum resistance to the turning of cam wheel 67. The cam wheel 67 is so arranged in reference to the tenths wheel 46a that when the tenths wheel 46a registers approximately nine and one-half tenths of a gallon, the bell hammer roller 73 reaches the fall 75 of its cam, causing the bell 70 to ring. This gives the automobile driver an interval corresponding to one-twentieth of a gallon of fuel consumption in which to observe the final reading of the gasoline mileage counter 45 before it is automatically reset to zero, through the release of the latch 66 by the cam 68.

The automatic resetting of counter 45, instituted by the release of latch 66, will now be explained.

The automatic resetting of the gasoline mileage counter 45 from a maximum of, say thirty miles, to zero would, by ordinary back winding through the planetary gears, require that the tenths wheel 45a be back turned thirty times. Rather than provide for so extensive a back winding, it is preferred to release the planetary gear interconnection between the tenths wheel 45a and the units wheel 45b and so arrange them that the tenths wheel need be back turned not over one revolution before it starts back turning the units wheel 45b in a one for one ratio. Assuming, as above, a maximum reading on the mileage counter 45 of thirty miles, the units wheel need be back turned not more than three revolutions in order to bring the tens wheel 45c to zero—which means a total back turning of the tenths wheel of not over a maximum of four revolutions.

Accordingly, the automatic resetting involves: (a) automatically setting the rewind mechanism in operation upon the completion of consumption of a gallon of fuel (which is accomplished by the latch 66 as just described); (b) disengaging the planetary gear drive between the tenths wheel 45a and the units wheel 45b; (c) arranging the back turn of the tenths wheel directly to back turn the units wheel; (d) disengaging the mileage counter drive gear 58 from the sleeve gear 59; (e) rapidly back driving the tenths sleeve 60 by a rewind mechanism; (f) terminating the back drive when all three wheels register zero; and (g) subsequently, during the consumption of the following gallon, storing up the power for the next back wind.

The mechanism for effecting the step (b) above includes a grooved collar 76 fixed on the tenths sleeve 60. A bell crank 77, engaged in the groove of the collar 76, axially shifts the sleeve 60 on the shaft 61 to pull the tenths wheel 45a away from the units wheel 45b, as shown in Fig. 5. The lower end of the latch 66 slips behind the collar 76, as shown in Fig. 4, and normally withholds the bell crank 77 from axially shifting the sleeve. However, when the latch 66 is released, as previously described, the sleeve 60 is shifted axially from the position of Fig. 4 to the position of Fig. 5 by the action of the bell crank spring 78. The separation of the wheels 45a and 45b disengages their planetary gear interconnection.

Step (c) above is accomplished by mounting a spring pawl 79 on the edge of the rim of the wheel 45b, so that its free end tends to move outwardly, and by incorporating a pawl notch 80 in the adjoining edges of the rim of the wheel 45a. The spring pawl and notch are so arranged that they interengage when the numbers on the two wheels are in register. The spring pawl 79 couples the two wheels only when the wheel 45a is turned backwardly in reference to the wheel 45b; forward turning of the wheel 45a in normal operation merely results in the pawl finger ratcheting past the notch 80. As shown in Fig. 5, when the wheel 45a has been shifted away from the wheel 45b, the spring 79 will still ride against the adjacent edge of the rim of the wheel 45a until it enters the notch 80.

It will thus be seen that when the sleeve 60 is back turned (by mechanism yet to be described) it may require up to one revolution of the sleeve 60 to bring the notch 80 into engagement with the spring pawl 79, and after that the further back turning of the sleeve 60 will back turn the wheel 45b with it. The wheel 45b in turn will back turn the wheel 45c one tenth of a revolution for every revolution of the sleeve 60.

Step (d) above is accomplished as an incident to the axial shifting of the sleeve 60. Fig. 5 shows how, when the sleeve 60 is shifted by the bell crank 77, the sleeve gear 59 is shifted out of engagement with the drive gear 58. When the sleeve is thus shifted to the position of Fig. 5, the shaft 41 does not drive the counter.

Back driving of the sleeve 60 (operation (e) above) is accomplished through a train of gears 81, which includes a pinion 81a and a drive gear 81b. From Fig. 5 is will be seen that when the sleeve 60 is in its shifted position, the sleeve gear 59 is in mesh with the drive gear 81b. The pinion 81a is in engagement with a back wind gear sector 82 (Fig. 6) which has, on the other side of its pivot 83, an offset integral arm 85 pulled by a tension spring 84. Thus, when the sector 82 is released, the spring 84 turns it clockwise, from the broken line position of Fig. 6 to the solid line position shown. Through the pinion 81a and the rest of the train of gears 81 and the sleeve gear 59, the sleeve 60 is back rotated as much as four or five turns, if necessary.

The gear sector 82, with its power stored in the spring 84 when 82 is in the dotted line position of Fig. 6, is released by the following mechanism: The offset end of the spring connection anchor arm 85 of the gear sector 82 has previously been caught in a slot 86 in a bifurcated sector release arm 87. As shown in Figs. 6 and 8, the sector release arm 87 is pivotally mounted at 88 in a frame 89, with its forked end embracing the shaft 61. When the sleeve 60 is shifted to the position of Fig. 5, the forked free end of the sector release lever 87, which bears against the end of the sleeve, is pushed to the right against the pressure of a biasing spring 90, thereby freeing the offset arm 85 from the slot 86, and permitting the sector 82 to rotate from the broken line position of Fig. 6 to the full line position for back winding the gasoline mileage counter 45.

The back drive is terminated (operation (f) above) by the following mechanism: A yoke shaped floating lever 91 (Figs. 4 and 5) is medially pivoted on the end of the lower arm of the bell crank 77 and is urged upwardly but rockably by the spring 78. The terminal wheels 45a and 45c of the counter 45 carry laterally extending studs 92 (Figs. 4 and 7). Each stud 92 will be in the rotary position nearest to, and will therefore engage, the adjacent upturned end of the floating lever 91, when its wheel is at zero position. If one of the terminal wheels is at zero position, but the other is not, the lever will merely rock rather than push back against the pressure of the spring 79. But when both terminal wheels 45a and 45c are at zero position, the lever is held centrally rather than in rocked position, and therefore the simultaneous approach of the studs 92 will push the entire lever downwardly against the pressure of the spring 79, and thereby rock the bell crank 77 counterclockwise to shift the sleeve 60 back to its normal position, whereupon the latch 66 will latch behind the collar 76 of the sleeve. The shifting of the sleeve 60 back to its normal position terminates the back winding because the sleeve gear 59 is shifted out of engagement with the drive gear 81b and back into engagement with the mileage counter drive gear 58, whereupon it is again driven by the speedometer shaft.

This termination of the back winding, as explained, is effected upon the terminal wheels 45a and 45c coming into zero position. However, it inherently follows that the intermediate wheel 45b will also be at zero position, since in back winding, the wheels 45a and 45b will first have been brought into register by virtue of the spring pawl 79 and notch 80.

After the back wind has been terminated, restoring the gasoline mileage counter 45 to zero reading and re-establishing the drive therefor by the speedometer shaft, the gear sector 82 and its spring 84 are to be connected for supplying the power for the next rewind. This is accomplished upon the first rotation of the sleeve 60 after the counter has been reset to zero, that is, during the first mile. The gear sector 82 always swings its full arc from the broken line position of Fig. 6 to the full line position of Fig. 6, continuing even after the sleeve 60 is shifted back to its normal position. The sleeve 60 carries an integral cam wheel 94 which is somewhat similar to the cam wheel 67. When the tenths wheel 45a is at zero position, the cam wheel 94 is at the position shown in Fig. 6 so that a cam roller 93, carried by the gear sector 82, rides behind the fall of the cam wheel 94. Then, during the first revolution of the sleeve 60 following the reset of the register—that is, during the first mile thereafter—the sleeve cam wheel 94 rotates one revolution, slowly swinging the gear sector from the full line position of Fig. 6 to the broken line position. As the gear sector 82 approaches the broken line position of Fig. 6, its offset arm 85 cams the sector release lever 87 from its broken line position of Fig. 9 to the full line position of Fig. 9, until the arm 85 reaches the slot 86, whereupon the spring 90 pushes the lever back to the broken line position of Fig. 9, and locks the gear sector 82 in its broken line position of Fig. 6, until the next resetting. To enable this latching of the gear sector to be accomplished, the end of the lever 87 has a slotted bearing on its pivot pin 88, as shown in Figs. 8 and 9.

As will be seen from a comparison of Figs. 4 and 5, when the sleeve 60 is shifted to the right for back winding, at which time the gear sector 82 drives the back wind, the cam wheel 94 has been shifted out of the plane of the roller 93 on the gear sector. Thus, the gear sector is free to rotate to effect the back winding regardless of the angular position of the cam wheel 94 at the time the resetting is initiated.

It will be understood that the resetting is in practice accomplished very rapidly—almost instantaneously—so that there is no appreciable rotation of either the speedometer shaft 36 or the fuel meter shaft 44 during the resetting. While not essential, it is preferred as an additional safeguard to stop the back winding of the wheel 45c at zero position by a fixedly mounted spring pawl 95 fixedly mounted on the shaft 61 and engaging a notch 96 in the adjacent face of the rim of the wheel 45c to stop the latter at zero on the back wind, as shown in Figs. 4 and 7.

As previously mentioned, in order that the gallonage-per-hour indicator 47 may be operated after the fashion of the miles-per-hour indicator of a speedometer, a fuel meter 43 is shown of such a design that it imparts a continuous rotation to the flexible shaft 44, as distinguished from an intermittent rotation which might serve if the indicator 47 were not incorporated.

The meter 43 will now be described. In general, the shaft of the meter, which is coupled to the shaft 44 to drive it, is driven from a shaft which is provided at its opposite ends with cranks driven by flexible diaphragm through suitable connecting rods. The two diaphragms are mounted for pulsation within separate diaphragm chambers. By means of a rotary distributing valve, the fuel is fed first to one side and then to the other side of the diaphragm in each of the two diaphragm chambers, to provide properly timed sequential paths for the fuel through the fuel meter as it passes from the fuel pump 33 to the carburetor 31. The two cranks are relatively displaced ninety degrees to obviate the danger of the crank shaft jamming at dead center.

In order that the gallonage-per-hour indicator 47 may more accurately reflect the actual rate of fuel consumption at any moment, it is preferable that the carburetor 31 be of a type which does not operate with a relatively intermittent flow to a float chamber. Or, if such a float chamber be required, it is preferable that the fuel meter be connected between the float chamber and the fuel nozzle in the carburetor.

While only a specific embodiment of the invention has been described, it is contemplated that many changes and substitutions may be made without departing from the scope or spirit of the invention, as set forth in the following claims.

The invention described herein may be manufactured and used by or for the Government of the United States of America for governmental purposes without the payment of any royalties thereon or therefor.

What is claimed is:

1. A gasoline consumption instrument for an automotive vehicle comprising a trip mileage counter, the counter comprising a plurality of side-by-side digit wheels mounted on a common shaft, ten-to-one ratio drives interconnecting the adjoining counter wheels, the first digit wheel carrying a sleeve rotatable and slidable upon the shaft, means for axially shifting the sleeve to separate the first and second digit wheels to disconnect their interengaging drive, a gear driven by the speed of the vehicle normally in engagement with the sleeve gear, a back wind spring, a gear train operated thereby and including a gear engaged by the gear sleeve when the sleeve is in shifted position, a latch for holding the sleeve in its unshifted position, a fuel meter driven means for releasing the latch at periodic volumetric intervals of fuel consumption, means for return shifting the sleeve to latched position when the wheels have been reset to zero, means including a portion rotating with the sleeve for retensioning the back wind spring during the rotation of the sleeve following the return shifting of the sleeve, and means for latching the spring in tensioned position until the subsequent shifting of the sleeve.

2. In a fuel mileage computer for automotive vehicles, an odometer comprising a shaft, a plurality of side-by-side digit wheels mounted thereon, and ratio drives interconnecting adjacent wheels, a sleeve rotatable and slidable on said shaft and fixed to a first one of said wheels, driving gear for said sleeve disconnectible by axial movement of the sleeve, latch means for holding said sleeve against axial movement, a fuel flow meter, mechanism controlled by said meter and operative at periodic volumetric intervals of fuel flow to release said latch, shift mechanism operable upon release of said latch to shift said sleeve axially of said shaft to disconnect said first wheel from its adjacent wheel and also to disconnect said driving gear, means operable while the sleeve is in shifted position to reset said wheels to zero, and means for returning said sleeve and said first wheel to unshifted position.

3. In a fuel mileage computer for automotive vehicles, an odometer comprising a shaft and a plurality of digit wheels mounted thereon and including a first and a second wheel having a driving interconnection disconnectible by axial movement of the first wheel, a sleeve rotatable and slidable on said shaft and fixed to said first wheel, driving gear for said sleeve disconnectible by axial movement of said sleeve, a detent for holding said sleeve against axial movement, a fuel flow meter, mechanism controlled by said meter and becoming operable upon flow of a predetermined volume of fuel to release said detent, shift mechanism operable upon release of said detent to shift said sleeve axially of said shaft to disconnect said interconnection and said driving gear, means operative while the sleeve is in shifted position to reset said wheels to zero, and means for returning said sleeve and said first wheel to unshifted position.

4. The invention defined in claim 3, comprising in addition means for receiving and storing energy transmitted by said driving gear and utilizing such energy for actuating said reset means and said returning means.

5. The invention defined in claim 4, comprising in addition signal means becoming operative immediately prior to operation of the resetting means.

WILLIAM J. STURTZ.

References Cited in the file of this patent

UNITED STATES PATENTS

| Number | Name | Date |
| --- | --- | --- |
| Re. 15,651 | Stuber | July 10, 1923 |
| 527,979 | Henley et al. | Oct. 23, 1894 |
| 806,541 | Hagspiel | Dec. 5, 1905 |
| 1,401,315 | Clark | Dec. 27, 1921 |
| 1,433,310 | Stuber | Oct. 24, 1922 |
| 1,477,487 | Hough | Dec. 11, 1923 |
| 1,478,010 | Stuber | Dec. 18, 1923 |
| 1,660,641 | Banning | Feb. 28, 1928 |